Nov. 2, 1926. 1,605,138

L. N. PARKS

AGITATING IMPLEMENT

Filed Feb. 27, 1926

Inventor
L. N. Parks,
By Clarence A. O'Brien
Attorney

Patented Nov. 2, 1926.

1,605,138

UNITED STATES PATENT OFFICE.

LEE N. PARKS, OF CARO, MICHIGAN.

AGITATING IMPLEMENT.

Application filed February 27, 1926. Serial No. 91,128.

This invention relates to agitators and more particularly to the hand type for use in the mixing of paint, the washing of clothes, and other kindred uses, the size of the device being regulated according to the nature of the work to be performed.

The primary object resides in the provision of an agitator having a vacuum cup movable on the handle shaft thereof and above an agitating dasher in order that the material will be additionally agitated by suction resulting in an efficient mixing operation as well as the extraction of dirt from clothes or other articles being washed.

With the foregoing and other objects in view as the nature of the invention will be better understood, the same comprises the novel form, combination and arrangement of parts, hereinafter more fully described, shown in the accompanying drawing and claimed.

In the drawing wherein like reference characters indicate corresponding parts throughout both of the views.

Figure 1:
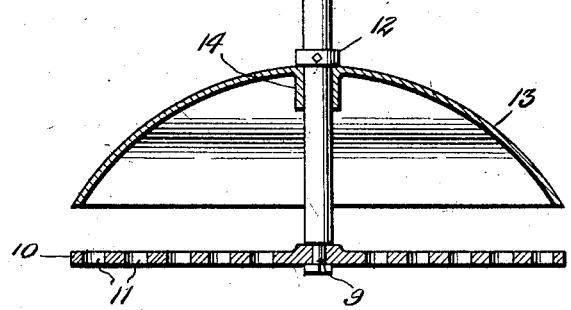
Figure 1 is a view in longitudinal section of an agitator constructed in accordance with the present invention.
Figure 2:
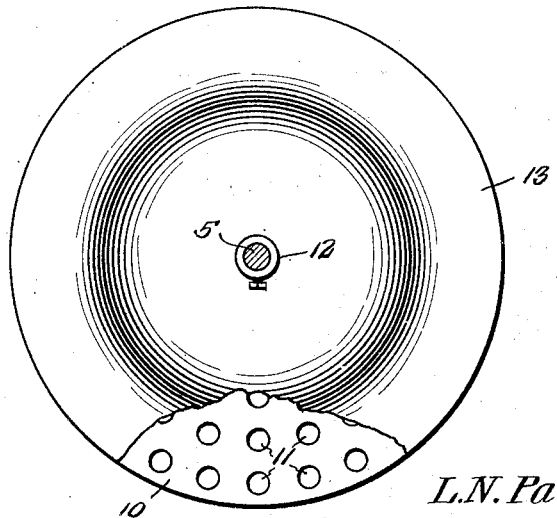
Figure 2 is a section taken through the handle shaft and looking downwardly upon the vacuum cup, the same being partly broken away for more clearly disclosing the shape of the agitating dasher member.

Now having particular reference to the drawing, my novel agitator constitutes the provision of the handle shaft 5 of desirable length reduced and threaded at one end to provide a pin 6 in order that a cross handle 7 may be secured thereto through reason of a nut 8 threaded upon said pin. The opposite end of the handle shaft 5 is similarly reduced and threaded for providing a pin 9 upon which is arranged a circular dasher plate 10 provided throughout its entire area with circumferential rows of spaced openings 11 to allow the fluid within which the device is working to pass therethrough, permitting of the easy reciprocatory motion of the agitator within said fluid.

Adjustably arranged upon the handle shaft 5 is a stop collar 12 while slidably mounted upon the handle shaft between the collar and dasher 10 is a substantially semi-spherical inverted metallic vacuum cup 13 surrounding the central opening in which is a pendent sleeve 14 for bracing the cup upon the shaft and preventing the wobbling movement of the same during actuation of the device.

It will be apparent that during the downward movement of the agitator within the fluid, the cup 13 will be forced upwardly to the position shown in Figure 1. Upon the upstroke, the cup will slide downwardly and rest upon the dasher 10 producing a suction within the fluid which will obviously cause the same to follow the cup during its upward movement resulting in the efficient agitation of said fluid.

Minor changes may be made in the invention wtihout departing from the spirit and scope of the appended claims.

Having thus described the invention, what I claim as new and desire to secure by Letters Patent is:—

1. In an agitator of the character described, a handle shaft, a circular dasher member upon one end of the handle shaft provided throughout its area with openings, a vacuum cup slidable upon the handle shaft adapted for rest upon the dasher at its downward limit of movement and adjustable means for limiting the upward movement of the cup upon said handle shaft.

2. In an agitator of the character described, a handle shaft, a circular dasher member upon one end of the handle shaft provided throughout its area with openings, a vacuum cup slidable upon the handle shaft adapted for rest upon the dasher at its downward limit of movement and adjustable means for limiting the upward movement of the cup upon said handle shaft, said means comprising a collar adjustable upon said handle shaft.

3. In an agitator of the character described, a handle shaft, a circular perforated dasher plate detachably secured to one end of the handle shaft, and a semi-spherical inverted vacuum cup slidable upon the handle shaft and adapted for rest upon the dasher at its downward limit of movement and adjustable means for limiting the upward movement of the cup upon the handle shaft.

In testimony whereof I affix my signature.

LEE N. PARKS.